US007001864B2

(12) United States Patent
Kiso et al.

(10) Patent No.: US 7,001,864 B2
(45) Date of Patent: Feb. 21, 2006

(54) CATALYST COMPOSITION FOR PRODUCTION OF A POLYURETHANE RESIN, AND METHOD FOR PRODUCING A POLYURETHANE RESIN

(75) Inventors: Hiroyuki Kiso, Yamaguchi-ken (JP); Hiroyuki Yoshimura, Yamaguchi-ken (JP); Shinichi Inoue, Aichi-ken (JP); Kouhei Tomita, Aichi-ken (JP)

(73) Assignee: Tosoh Corporation, Yamaguchi-ken (JP)

( * ) Notice: Subject to any disclaimer, the term of this patent is extended or adjusted under 35 U.S.C. 154(b) by 0 days.

(21) Appl. No.: 10/802,029

(22) Filed: Mar. 17, 2004

(65) Prior Publication Data

US 2004/0192875 A1 Sep. 30, 2004

(30) Foreign Application Priority Data

Mar. 18, 2003 (JP) ............................ 2003-074544
May 7, 2003 (JP) ............................ 2003-128994
May 14, 2003 (JP) ............................ 2003-136128

(51) Int. Cl.
*B01J 31/00* (2006.01)

(52) U.S. Cl. ......................... 502/155; 502/161; 528/48

(58) Field of Classification Search ................ 502/155, 502/161; 528/48
See application file for complete search history.

(56) References Cited

U.S. PATENT DOCUMENTS 4,151,345 A * 4/1979 Hillegass ..................... 528/56
5,006,511 A * 4/1991 Greenlee et al. .............. 514/19
5,166,183 A * 11/1992 Franyutti et al. ............. 521/51
5,514,723 A * 5/1996 Madaj et al. ................. 521/51
5,672,632 A * 9/1997 Voloppi et al. ............... 521/51
5,733,945 A * 3/1998 Simpson ...................... 521/24
5,744,554 A * 4/1998 Pfaendner et al. .......... 525/439
5,866,580 A * 2/1999 Gangjee .................. 514/266.3
5,889,068 A * 3/1999 Madaj et al. ............... 521/137
5,902,835 A * 5/1999 Meier et al. ................ 521/125
6,066,732 A * 5/2000 Taylor et al. ............... 544/280
6,486,224 B1 * 11/2002 Lin et al. ..................... 521/159
6,759,443 B1 * 7/2004 Brant et al. .................... 521/51
6,790,963 B1 * 9/2004 Chiang et al. .............. 548/417

FOREIGN PATENT DOCUMENTS

EP 1 163 956 A1 12/2001

OTHER PUBLICATIONS http://www.chemindustry.com/chemicals/11983.html (DABCO S-25).*
Harb, et al., "Pyrazoles as Building Blocks in Heterocyclic Synthesis: . . . ", Jun. 2005, Journal of the Iranian Chemical Society, vol. 2, No. 2, pp. 115-123.*

* cited by examiner

*Primary Examiner*—J. A. Lorengo
*Assistant Examiner*—Jennine Brown
(74) *Attorney, Agent, or Firm*—Nixon & Vanderhye P.C.

(57) ABSTRACT

A catalyst composition for production of a polyurethane resin, which comprises a metal complex catalyst represented by the following formula (1):

$$M(acac)_n \quad (1)$$

wherein M represents Mn, Fe, Co, Ni, Cu, Zn, Zr, Ti, Hf, Al or Th, acac represents acetylacetonate, and n is an integer of from 1 to 4, and at least one compound selected from the group consisting of a bicyclic tertiary amine compound represented by the following formula (2):

(2)

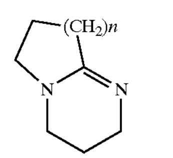

wherein n is an integer of from 1 to 3, a compound having a cumulative double bond, and a quaternary ammonium salt compound.

12 Claims, No Drawings

CATALYST COMPOSITION FOR PRODUCTION OF A POLYURETHANE RESIN, AND METHOD FOR PRODUCING A POLYURETHANE RESIN

The present invention relates to a catalyst composition for production of a polyurethane resin and a method for producing a polyurethane resin employing such a catalyst composition. With the catalyst composition of the present invention, when an organic polyisocyanate is employed, it is possible to produce a polyurethane resin excellent in the curing speed, weather resistance and coating properties.

A polyurethane resin is produced commonly by reacting a polyol with an organic polyisocyanate in the presence of a catalyst and, if necessary, a blowing agent, a surfactant, a crosslinking agent, etc. Its curing reaction proceeds even at room temperature, it is possible to form a resin having a crosslinked structure, and it is excellent in the adhesion to a substrate, flexibility and weather resistance. Thus, it is widely used for various applications to e.g. automobiles, buildings, home electric appliances, heavy duty coatings, plastic coatings, adhesives, etc. Especially when an aliphatic isocyanate is employed, its coating tends to scarcely undergo yellowing by light or heat, and it is used for various finish coating materials which are required to have weather resistance. However, as compared with an aromatic isocyanate represented by TDI or MDI, the reaction speed with a polyol is substantially slow, and a catalyst having a higher activity is being required.

As a catalyst for production of a polyurethane, a tertiary amine catalyst or a metal catalyst is widely used. However, as a catalyst for an aliphatic isocyanate, an organic tin catalyst is used as its activity is high, and dibutyltin dilaurate (hereinafter sometimes referred to as DBTDL) or stannous octoate is mainly used in many cases (e.g. Tetsuo Yokokawa "Structure and Physical Properties of Polyurethanes, and Developments for Higher Functionality and Applications" published by Gijutsu Joho Kyokai, 1998, p. 325).

Further, recently, transition metal complex type catalysts have been studied as new catalysts. Among them, researches for metal acetylacetonate type catalysts have been active (e.g. JP-A-2003-82052, or R. A. Ligabue, "J. Mol. Catal. A. Chem.", 2000, vol. 157, p. 73).

However, with respect to the above-mentioned organic tin catalysts which are presently used, many problems have been pointed out. For example, in recent years, a toxicity problem of organic tin catalysts has been pointed out. Particularly, tributyltin contained as an impurity in DBTDL is regarded as problematic, as it presents harmful effects to a human body as an environmental hormone. Mainly in Europe, there has already been a movement to control use of an organic tin catalyst in the production of polyurethane. Accordingly, it is strongly desired to develop a substitute catalyst in place of such an organic tin catalyst.

Whereas, a metal acetylacetonate type catalyst represented by iron acetylacetonate or copper acetylacetonate is low in the catalytic activities, and can hardly accomplish the curing speed at a level where an organic tin catalyst is employed.

Whereas, by using the metal acetylacetonate type catalyst and triethylenediamine in combination, the catalytic activities can be improved over a case where the metal acetylacetonate is used alone, but a catalyst having still higher activities, is desired.

As described in the foregoing, in a method for producing a polyurethane resin employing an organic polyisocyanate, a catalyst has been desired which is capable of accomplishing high speed curing of the coating and improving the physical properties of the coating and which can be substituted for an organic tin catalyst.

In view of the foregoing situation, the present inventors have conducted an extensive study on catalysts for polyurethane reactions to improve the curing speed of the organic polyisocyanate and as a result have found a catalyst which is capable of effectively accelerating the reaction of an alcohol with an organic polyisocyanate and which can be substituted for an organic tin catalyst, by using certain specific metal complex catalyst and organic compound in combination. On the basis of this discovery, the present invention has been accomplished.

Namely, the present invention provides a catalyst composition for production of a polyurethane resin and a method for producing a polyurethane resin, as shown below.

(1) A catalyst composition for production of a polyurethane resin, which comprises a metal complex catalyst represented by the following formula (1):

$$M(acac)_n \quad (1)$$

wherein M represents Mn, Fe, Co, Ni, Cu, Zn, Zr, Ti, Hf, Al or Th, acac represents acetylacetonate, and n is an integer of from 1 to 4, and at least one compound selected from the group consisting of a bicyclic tertiary amine compound represented by the following formula (2):

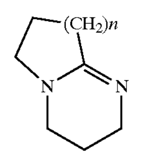

(2)

wherein n is an integer of from 1 to 3, a compound having a cumulative double bond, and a quaternary ammonium salt compound.

(2) The catalyst composition for production of a polyurethane resin according to the above (1), wherein the metal complex catalyst is at least one metal complex catalyst selected from the group consisting of manganese acetylacetonate, iron acetylacetonate, cobalt acetylacetonate, nickel acetylacetonate, zirconium acetylacetonate and titanium acetylacetonate.

(3) The catalyst composition for production of a polyurethane resin according to the above (1) or (2), wherein the bicyclic tertiary amine compound is 1,8-diazabicyclo[5,4,0]undecene-7 or 1,5-diazabicyclo[4,3,0]nonene-5.

(4) The catalyst composition for production of a polyurethane resin according to the above (1) or (2), wherein the compound having a cumulative double bond is at least one compound selected from the group consisting of an isocyanate, a ketene, an isothiocyanate, a carbodiimide and cumulene.

(5) The catalyst composition for production of a polyurethane resin according to the above (4), wherein the isocyanate is at least one compound selected from the group consisting of hexamethylene diioscyanate, hydrogenated dicyclohexylmethane diisocyanate, hydrogenated xylylene diisocyanate, isophorone diisocyanate, norbornane diisocyanate, 1,3-bis(isocyanate methyl)cyclohexane, L-lysine diisocyanate, 1,6,11-undecane triisocyanate, toluene diisocyanate, diphenylmethane diisocyanate, naphthylene diisocyanate and xylene diisocyanate.

(6) The catalyst composition for production of a polyurethane resin according to the above (1) or (2), wherein the quaternary ammonium salt compound is a quaternary ammonium salt compound represented by the following formula (3):

(3)

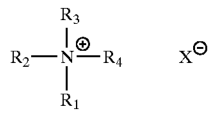

wherein each of $R_1$ to $R_4$ which are independent of one another, is a $C_{1-18}$ alkyl group, a $C_{1-18}$ aryl group, a $C_{1-12}$ hydroxyalkyl group, a $C_{1-12}$ aminoalkyl group, a $C_{1-12}$ monomethylaminoalkyl group, a $C_{1-12}$ dimethylaminoalkyl group, a group represented by the following formula (4):

(4)

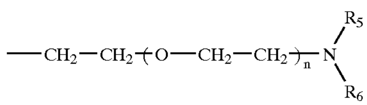

wherein each of $R_5$ and $R_6$ which are independent of each other, is a $C_{1-4}$ alkyl group, and n is an integer of from 0 to 5, or a group represented by the following formula (5):

(5)

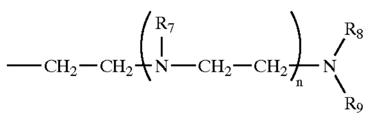

wherein each of $R_7$ to $R_9$ which are independent of one another, is a $C_{1-4}$ alkyl group, and n is an integer of from 0 to 5, any two among $R_1$ to $R_4$ may form a heterocyclic ring via carbon, nitrogen or oxygen atom(s), and X represents an organic acid group or an inorganic acid group.

(7) The catalyst composition for production of a polyurethane resin according to the above (6), wherein in the formula (3), the quaternary ammonium is at least one compound selected from the group consisting of tetramethylammonium, methyltriethylammonium, ethyltrimethylammonium, butyltrimethylammonium, hexyltrimethylammonium, octyltrimethylammonium, decyltrimethylammonium, dodecyltrimethylammonium, tetradecyltrimethylammonium, hexadecyltrimethylammonium, octadecyltrimethylammonium, (2-hydroxypropyl)trimethylammonium, hydroxyethyltrimethylammonium, 1-methyl-1-azania-4-azabicyclo[2,2,2]octanium, and 1,1-dimethyl-4-methylpiperidinium.

(8) The catalyst composition for production of a polyurethane resin according to the above (6), wherein in the formula (3), X is at least one member selected from the group consisting of a formic group, an acetic group, an octylic group, a methyl carbonic group, a halogen group, a hydroxyl group, a hydrogen carbonic group and a carbonic group.

(9) The catalyst composition for production of a polyurethane resin according to any one of the above (1) to (8), wherein the blend ratio of the metal complex catalyst (A) represented by the formula (1) to at least one compound (B) selected from the group consisting of the bicyclic tertiary amine compound represented by the formula (2), the compound having a cumulative double bond, and the quaternary ammonium salt compound is (A)/(B)=20 to 0.05 (molar ratio).

(10) A method for producing a polyurethane resin, which comprises reacting a polyol with an organic polyisocyanate in the presence of the catalyst composition for production of a polyurethane as defined in any one of the above (1) to (9), as a catalyst.

(11) A method for producing a polyurethane resin, which comprises reacting a polyol with an organic polyisocyanate in the presence of the catalyst composition for production of a polyurethane as defined in any one of the above (1) to (9), as a catalyst, and additives.

(12) The method for producing a polyurethane resin according to the above (10) or (11), wherein the catalyst is used in an amount of from 0.001 to 20 parts by weight per 100 parts by weight of the polyol.

Now, the present invention will be described in detail with reference to the preferred embodiments.

The catalyst composition for production of a polyurethane resin according to the present invention, comprises a metal complex catalyst represented by the above formula (1) and at least one compound selected from the group consisting of a bicyclic tertiary amine compound represented by the above formula (2), a compound having a cumulative double bond, and a quaternary ammonium salt compound.

In the present invention, the metal complex catalyst represented by the above formula (1) is an acetylacetonate salt of a metal selected from the group consisting of Mn, Fe, Co, Ni, Cu, Zn, Zr, Ti, Hf, Al and Th, preferably an acetylacetonate salt of a metal selected from the group consisting of Mn, Fe, Co, Ni, Cu, Zr, Ti, Al and Th. Specifically, manganese acetylacetonate, iron acetylacetonate, cobalt acetylacetonate, nickel acetylacetonate, zirconium acetylacetonate, titanium acetylacetonate, etc. may, for example, be mentioned. Among them, preferred from the viewpoint of the catalytic activities, is manganese(II) acetylacetonate ($Mn(acac)_2$), manganese(III) acetylacetonate ($Mn(acac)_3$), iron(II) acetylacetonate ($Fe(acac)_2$), iron(III) acetylacetonate ($Fe(acac)_3$), cobalt(II) acetylacetonate ($Co(acac)_2$), nickel(II) acetylacetonate ($Ni(acac)_2$) or zirconium (IV) acetylacetonate ($Zr(acac)_4$).

In the present invention, the bicyclic tertiary amine compound represented by the above formula (2) is not particularly limited. For example, it may be 1,8-diazabicyclo[5,4,0]undecene-7, 1,5-diazabicyclo[4,3,0]nonene-5, 1,8-diazabicyclo[5,3,0]decene-7, or 1,4-diazabicyclo[3,3,0]octane-4. Among them, 1,8-diazabicyclo[5,4,0]undecene-7 or 1,5-diazabicyclo[4,3,0]nonene-5 is preferred, since it is excellent in catalytic activities and industrially available.

In the present invention, the compound having a cumulative double bond is a compound having a double bond system wherein at least three elements are bonded solely by double bonds. Such a compound is not particularly limited, but may, for example, be an isocyanate, a ketene, an isothiocyanate, a carbodiimide or cumulene. Among them, an isocyanate is preferred, since it is excellent in catalytic activities and industrially available. As such an isocyanate, hexamethylene diioscyanate, hydrogenated dicyclohexylmethane diisocyanate, hydrogenated xylylene diisocyanate, isophorone diisocyanate, norbornane diisocyanate, 1,3-bis (isocyanate methyl)cyclohexane, L-lysine diisocyanate, 1,6, 11-undecane triisocyanate, toluene diisocyanate, diphenylmethane diisocyanate, naphthylene diisocyanate or xylene diisocyanate is preferred.

In the present invention, the quaternary ammonium salt compound may be a compound represented by the above formula (3) and is not particularly limited. The quaternary ammonium constituting the quaternary ammonium salt compound represented by the above formula (3), may, for example, be an aliphatic ammonium compound such as tetramethylammonium, methyltriethylammonium, ethyltrimethylammonium, propyltrimethylammonium, butyltrimethylammonium, pentyltrimethylammonium, hexyltrimethylammonium, heptytrimethylammonium, octyltrimethylammonium, nonyltrimethylammonium, decyltrimethylammonium, undecyltrimethylammonium, dodecyltrimethylammonium, tridecyltrimethylammonium, tetradecyltrimethylammonium, heptadecyltrimethylammonium, hexadecyltrimethylammonium, heptadecyltrimethylammonium or octadecyltrimethylammonium, a hydroxylammonium compound such as (2-hydroxypropyl) trimethylammonium, hydroxyethyltrimethylammonium or trimethylaminoethoxyethanol, or an alicyclic ammonium compound such as 1-methyl-1-azania-4-azabicyclo[2,2,2] octanium, 1,1-dimethyl-4-methylpiperidinium, 1-methylmorphorinium or 1-methylpiperidinium. Among them, tetramethylammonium, methyltriethylammonium, ethyltrimethylammonium, butyltrimethylammonium, hexyltrimethylammonium, octyltrimethylammonium, decyltrimethylammonium, dodecyltrimethylammonium, tetradecyltrimethylammonium, hexadecyltrimethylammonium, octadecyltrimethylammonium, (2-hydroxypropyl)trimethylammonium, hydroxyethyltrimethylammonium, 1-methyl-1-azania-4-azabicyclo[2,2,2]octanium or 1,1-dimethyl-4-methylpiperidinium is preferred, since it is excellent in catalytic activities and industrially readily available. Further, the acid constituting the quaternary ammonium salt compound represented by the above formula (3) is not particularly limited, but is preferably, for example, an organic acid group such as a formic group, an acetic group, an octylic group, an oxalic group, a malonic group, a succinic group, a glutaric group, an adipic group, a benzoic group, a toluic group, an ethylbenzoic group, a methylcarbonic group, a phenol group, an alkylbenzenesulfonic group, a toluenesulfonic group, a benzenesulfonic group or a phosphate group, or an inorganic acid group such as a halogen group, a hydroxyl group, a hydrogen carbonic group or a carbonic group. Among them, a formic group, an acetic group, an octylic group, a methyl carbonic group, a halogen group, a hydroxyl group, a hydrogen carbonic group and a carbonic group, is preferred, since it is excellent in catalytic activities and industrially available.

In the present invention, the blend ratio of the metal complex catalyst (A) represented by the above formula (1) to at least one compound (B) selected from the group consisting of the bicyclic tertiary amine compound represented by the above formula (2), the compound having a cumulative double bond, and the quaternary ammonium salt compound represented by the above formula (3), is not particularly limited, but usually, the blend ratio is adjusted so that the molar ratio of (A)/(B) will be within a range of from 20 to 0.05. If the molar ratio exceeds this range, the synergistic effects of the two catalysts may not sometimes be obtained, and there may be a case where no satisfactory performance can be obtained with respect to the coating physical properties and the catalytic activities.

The method for producing a polyurethane resin of the present invention comprises reacting a polyol and an organic polyisocyanate in the presence of the above-mentioned catalyst composition of the present invention as a catalyst.

In a case where the catalyst composition of the present invention is used for the production of a polyurethane resin, it is used usually in an amount within a range of from 0.001 to 10 parts by weight, preferably from 0.01 to 10 parts by weight, per 100 parts by weight of the polyol to be used. If it is less than 0.001 part by weight, the reaction rate tends to be extremely low, and there may be a case where no satisfactory performance can be obtained with respect to the coating physical properties. On the other hand, if it exceeds 10 parts by weight, no additional effect by the increase of the catalyst will be obtained.

In the present invention, the metal complex catalyst represented by the above formula (1) and at least one compound selected from the group consisting of a bicyclic tertiary amine represented by the above formula (2), a compound having a cumulative double bond and a quaternary ammonium salt compound represented by (3), to be used as the catalyst composition, may preliminarily be mixed and formulated and the formulated composition may be added at the time of the reaction, or they may simultaneously be added at the time of the reaction. Further, they may be used as dissolved in a solvent at the time of mixing.

The solvent is not particularly limited, but it may, for example, be an organic solvent of an alcohol such as ethylene glycol, diethylene glycol, dipropylene glycol, propylene glycol or butanediol, a hydrocarbon such as toluene, xylene or mineral turpen, an ester such as ethyl acetate, butyl acetate, methyl glycol acetate or cellosolve acetate, a ketone such as methyl ethyl ketone, methyl isobutyl ketone or cyclohexanone, or an amide such as N,N-dimethylformamide or N,N-dimethylacetamide, or a solvent which can be chelated, such as a β-diketone such as acetylacetone or its fluorinated substituent, a ketoester such as methyl acetoacetate or ethyl acetoacetate.

In the method for producing a polyurethane resin of the present invention, as a catalyst, in addition to the catalyst composition of the present invention comprising the metal complex catalyst represented by the above formula (1) and at least one compound selected from the group consisting of the bicyclic tertiary amine compound represented by the above formula (2), the compound having a cumulative double bond, and the quaternary ammonium salt compound represented by the above formula (3), another organic metal catalyst or tertiary amine catalyst may be used in combination within a range not to depart from the concept of the present invention.

Such another organic metal catalyst may be an organic metal heretofore known as a catalyst for producing polyurethane and is not particularly limited. Specifically, it may, for example, be an organic tin catalyst such as stannous diacetate, stannous dioctoate, stannous dioleate, stannous dilaurate, dibutyltin oxide, dibutyltin diacetate, dibutyltin dilaurate, dibutyltin dichloride or dioctyltin dilaurate, or nickel octylate, nickel naphthenate, cobale octylate, cobalt naphthenate, bismuth octylate or bismuth naphthenate. Among them, a preferred compound is an organic tin catalyst, and more preferably it is stannous dioctoate or dibutyltin dilaurate. In the method for producing a polyurethane resin of the present invention, by the use of the catalyst composition of the present invention, the amount of the organic tin catalyst to be used can be reduced substantially.

Another tertiary amine catalyst may be a conventional tertiary amine catalyst known as a catalyst for production of polyurethane and is not particularly limited. Specifically, it may, for example, be triethylenediamine, 2-methyltriethylenediamine, N,N,N',N'-tetramethylethylenediamine, N,N,N',N'-tetramethylpropylenediamine, N,N,N',N",N"-pentamethyldiethylenetriamine, N,N,N',N",N"-pentamethyl-(3-aminopropyl)ethylenediamine, N,N,N',N",N"-pentamethyldipropylenetriamine, N,N,N',N'-tetramethylhexamethylenediamine, bis(2-dimethylaminoethyl)ether, dimethylethanolamine, dimethylisopropanolamine, dimethylaminoethoxyethanol, N,N-dimethyl-N'-(2-hydroxyethyl)ethylenediamine, N,N-dimethyl-N'-(2-hydroxyethyl)propanediamine, bis(dimethylaminopropyl)amine, bis(dimethylaminopropyl)isopropanolamine, 3-quinuclidinol, N,N,N',N'-tetramethylguanidine, 1,3,5-tris(N,N-dimethylaminopropyl)hexahydro-S-triazine, 1,8-diazabicyclo[5.4.0]undecene-7, N-methyl-N'-(2-dimethylaminoethyl)piperazine, N,N'-dimetylpiperazine, dimethylcyclohexylamine, N-methylmorpholine, N-ethylmorpholine, 1-methylimidazole, 1,2-dimethylimidazole, 1-isobutyl-2-methylimidazole, 1 -dimethylaminopropylimidazole, N,N-dimethyhexanolamine, N-methyl-N'-(2-hydroxyethyl)piperazine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole, quinuclidine or 2-methylquinuclidine.

In the present invention, in a case where another organic metal catalyst or another tertiary amine catalyst is used, it is used usually in an amount of from 0.0001 to 5 parts by weight, preferably from 0.001 to 3 parts by weight, per 100 parts by weight of the polyol.

In the method for producing a polyurethane resin of the present invention, the polyol to be used, is not particularly limited. However, a conventional polyether polyol, a polyester polyol, a polycarbonate type polyol, an acrylic polyol, a polybutadiene type polyol, a polyolefin type polyol, a caprolactam modified polyol, a polyester amide polyol, a polyurethane polyol, an epoxy polyol, an epoxy-modified polyol, an alkyd-modified polyol, caster oil or a fluorinated polyol may, for example, be used. These polyols may be used alone or in proper combination as a mixture.

The polyether polyol can be produced, for example, by a method, for example, by Gunter Oertel, "Polyurethane Handbook" (1985), Hanser Publishers (Germany), p.42–53 by using as a starting material a compound having at least two active hydrogen groups, such as a polyhydric alcohol such as ethylene glycol, propylene glycol, butylene glycol, tetramethylene glycol, glycerol, trimethylolpropane, pentaerythritol, sorbitol or sucrose, an aliphatic amine compound such as ethylene diamine, an aromatic amine compound such as toluenediamine or diphenylmethane-4,4-diamine, or an alkanolamine such as ethanolamine or diethanolamine, and subjecting it to an addition reaction with an alkylene oxide represented by ethylene oxide or propylene oxide.

The polyester polyol may, for example, be a condensate of a polyhydric alcohol with a polybasic acid such as maleic anhydride, fumaric acid, itaconic anhydride, itaconic acid, adipic acid or isophthalic acid, or a polyester polyol obtained from a waste at the time of production of nylon, a waste of trimethylolpropane or pentaerythritol, a waste of a phthalic acid type polyester, or treatment of a waste product, as disclosed by Keiji Iwata "Polyurethane Resin Handbook" (first edition in 1987), Nikkan Kogyo Shinbunsha, p.116–117.

In the method for producing a polyurethane resin of the present invention, the average molecular weight of the polyol is preferably within a range of from 200 to 10,000. If the average molecular weight is less than 200, the distances between crosslinking points tend to be so short that when formed into a coating, the flexibility tends to be inadequate, and the anticracking property tends to be inadequate. If it exceeds 10,000, the crosslinking density tends to be low, and when formed into a coating, the toughness or hardness tends to be inadequate, whereby no adequate effects of the present invention may be obtained.

In the method for producing a polyurethane resin of the present invention, the organic polyisocyanate to be used may be a conventional one and is not particularly limited. For example, an aromatic isocyanate such as toluene diisocyanate (TDI), diphenylmethane diisocyanate (MDI), naphthylene diisocyanate or xylylene diisocyanate, an aliphatic isocyanate such as hexamethylene diisocyanate, an alicyclic isocyanate such as dicyclohexyl diisocyanate or isophorone diisocyanate, or a mixture thereof may be mentioned. Among them, preferred is an aliphatic isocyanate for the purpose of imparting excellent coating physical properties and weather resistance.

As the aliphatic isocyanate, a conventional linear aliphatic, cycloaliphatic or alicyclic isocyanate, may be mentioned. Specifically, an isocyanate such as hexamethylene diisocyanate (hereinafter sometimes referred to simply as HDI), hydrogenated diphenylmethane diisocyanate (hereinafter sometimes referred to simply as H-MDI), hydrogenated xylylene diisocyanate (hereinafter sometimes referred to simply as H-XDI), isophorone diisocyanate (hereinafter sometimes referred to simply as IPDI), norbornane diisocyanate (hereinafter sometimes referred to simply as NBDI), 1,3-bis(isocyanate methyl)cyclohexane (hereinafter sometimes referred to simply as H6XDI), L-lycine diisocyanate (hereinafter sometimes referred to simply as LDI) or 1,6,11-undecane triisocyanate, or a dimer modified product, trimer modified product, buret-modified product or allophanate modified product of such an isocyanate, or a blocked isocyanate product of such an organic polyisocyanate compound, or a NCO group-terminal prepolymer as a reaction product thereof with the above-mentioned active hydrogen containing compound, may be used alone or as mixed.

The blocked isocyanate may, for example, be one having active isocyanate groups blocked with e.g. an alcohol such as ethanol, isopropanol or n-butanol, a phenol such as phenol or p-niotrophenol, a lactam such as $\epsilon$-caprolactam, an oxime such as acetoxime or methyl ethyl ketoxime, or an active methylene-containing compound such as diethyl malonate, ethyl acetoacetate or acetyl acetone.

In the method for producing a polyurethane resin of the present invention, the isocyanate index is not particularly limited, but it is usually within a range of from 50 to 250, more preferably within a range of from 70 to 150. If it is less than 70, the crosslinking density tends to be low, whereby the resin strength tends to be low, and if it exceeds 150, unreacted isocyanate groups tend to remain, whereby the drying property of the coating tends to deteriorate.

In the method for producing a polyurethane of the present invention, additives may be used, as the case requires. Such additives may, for example, be a crosslinking agent or a chain extender, a pigment, a colorant, a flame retardant, an aging preventive agent, an antioxidant, a filler, a thickener, a viscosity-reducing agent, a plasticizer, an anti-sagging agent, a precipitation-preventing agent, a defoaming agent, an UV absorber, a solvent, a thixotropic agent, an adsorbent and other known additives. The types and amounts of such additives may suitably be used within the commonly employed ranges so long as they do not depart from known methods and procedures.

In the method of the present invention, the crosslinking agent or chain extender may, for example, be a polyhydric alcohol having a low molecular weight (such as ethylene glycol, 1,4-butanediol, 1,3-butanediol, 1,6-hexanediol, glycerol or the like), a low molecular weight amine polyol (such as diethanolamine, triethanolamine or the like), or a polyamine (such as ethylenediamine, diethylenetriamine, piperazine, N-aminoethylpiperazine, xylylene diamine or methylenebisorthochloroaniline).

In the method of the present invention, a solvent may be used to dissolve and dilute a material such as an isocyanate or a polyol. Such a solvent may be an organic solvent, for example, a hydrocarbon such as toluene, xylene or mineral turpen, an ester such as ethyl acetate, butyl acetate, methylglycol acetate or cellosolve acetate, a ketone such as methyl ethyl ketone, methyl isobutyl ketone or cyclohexanone, or an amide such as N,N-dimethylformamide or N,N-dimethylacetamide.

In the present invention, if moisture is present in the system, a foaming phenomenon may take place, or the catalytic activities tend to be weak during the reaction. Accordingly, it is advisable to remove the moisture. For the removal of moisture, it is preferred that not only the materials such as the polyol, the prepolymer, etc. are subjected to vacuum dehydration under heating, but also an adsorbent such as molecular sieve or zeolite is added to the system.

The catalyst composition of the present invention has a high catalytic activity in the urethane-forming reaction, is capable of improving the production rate of a polyurethane product, can be substituted for an organic tin catalyst and thus is industrially extremely effective.

Now, the present invention will be described in further detail with reference to Examples and Comparative Examples. However, it should be understood that the present invention is by no means restricted to such specific Examples.

EXAMPLE 1

Into a 200 ml Erlenmeyer flask flushed with nitrogen, 0.008 g (0.03 mmol) of manganese(II) acetylacetonate (Mn $(acac)_2$) as a metal catalyst, 0.005 g (0.03 mmol) of 1,8-diazabicyclo[5,4,0]undecene-7 (DBU) as a bicyclic tertiary amine compound and 1.10 g (10.4 mmol) of diethylene glycol (DEG) were charged, and 50 ml of N,N-dimethylformamide (DMF) was added thereto, to prepare a DEG-DMF solution. Into a 100 ml Erlenmeyer flask flushed with nitrogen, 1.42 g (10.4 mmol) of hexamethylene diisocyanate (HDI) and 50 ml of N,N-dimethylformamide (DMF) were added to prepare a HDI-DMF solution. The DEG-DMF solution and the HDI-DMF solution were respectively stirred for 30 minutes at 30° C., whereupon the HDI-DMF solution was added to the DEG-DMF solution, and the reaction was initiated with stirring. After initiation of the reaction, about 10 ml of the reaction solution was sampled every from 20 to 30 minutes, and an unreacted isocyanate was reacted with an excess di-n-butylamine (DBA) solution, and the remaining DBA was back-titrated with a 0.5 N hydrochloric acid standard solution to quantify the unreacted isocyanate amount.

The reaction rate constant k (1/mol·hr) was obtained on the assumption that the reaction of an isocyanate and an alcohol is primary to the respective concentrations. Further, the rate constant Kc ($1^2$/eq·mol·hr) per catalyst was obtained by dividing the reaction rate constant k by the catalyst concentration. The results are shown in Table 1.

TABLE 1

| | Example No. | | | | | | | | |
|---|---|---|---|---|---|---|---|---|---|
| | 1 | 2 | 3 | 4 | 5 | 6 | 7 | 8 | 9 |
| Catalyst (mmol) | | | | | | | | | |
| $Mn(acac)_2$ | 0.03 | | | | | 0.03 | 0.27 | 0.13 | 0.067 |
| $Mn(acac)_3$ | | 0.03 | | | | | | | |
| $Ni(acac)_2$ | | | 0.03 | | | | | | |
| $Fe(acac)_2$ | | | | 0.03 | | | | | |
| $Zr(acac)_4$ | | | | | 0.03 | | | | |
| DBU | 0.03 | 0.03 | 0.03 | 0.03 | 0.03 | | 0.13 | 0.27 | 0.333 |
| DBN | | | | | | 0.03 | | | |
| DBTDL | | | | | | | | | |
| Alcohol (mmol) | | | | | | | | | |
| DEG | 10.4 | 10.4 | 10.4 | 10.4 | 10.4 | 10.4 | 10.4 | 10.4 | 10.4 |
| Isocyanate (mmol) | | | | | | | | | |
| HDI | 10.4 | 10.4 | 10.4 | 10.4 | 10.4 | 10.4 | 10.4 | 10.4 | 10.4 |
| Reaction rate constant | | | | | | | | | |
| Kc($l^2$/eq · mol · h) | 99977 | 68892 | 23060 | 47281 | 63000 | 109975 | 65244 | 62616 | 68146 |

| | Comparative Example No. | | | | | | | |
|---|---|---|---|---|---|---|---|---|
| | 1 | 2 | 3 | 4 | 5 | 6 | 7 | 8 |
| Catalyst (mmol) | | | | | | | | |
| $Mn(acac)_2$ | 0.06 | | | | | | | |
| $Mn(acac)_3$ | | 0.06 | | | | | | |
| $Ni(acac)_2$ | | | 0.06 | | | | | |
| $Fe(acac)_2$ | | | | 0.06 | | | | |
| $Zr(acac)_4$ | | | | | 0.06 | | | |
| DBU | | | | | | 0.06 | | |

TABLE 1-continued

| | | | | | | | | |
|---|---|---|---|---|---|---|---|---|
| DBN | | | | | | | 0.06 | |
| DBTDL | | | | | | | | 0.06 |
| Alcohol (mmol) | | | | | | | | |
| DEG | 10.4 | 10.4 | 10.4 | 10.4 | 10.4 | 10.4 | 10.4 | 10.4 |
| Isocyanate (mmol) | | | | | | | | |
| HDI | 10.4 | 10.4 | 10.4 | 10.4 | 10.4 | 10.4 | 10.4 | 10.4 |
| Reaction rate constant | | | | | | | | |
| Kc($l^2$/eq · mol · h) | 65841 | 40003 | 9032 | 48235 | 57436 | 5185 | 5704 | 52058 |

$Mn(acac)_2$: Manganese(II) acetylacetonate (manufactured by Tokyo Kasei Kogyo Co., Ltd.)
$Mn(acac)_3$: Manganese(III) acetylacetonate (manufactured by Tokyo Kasei Kogyo Co., Ltd.)
$Ni(acac)_2$: Nickel(II) acetylacetonate (manufactured by Tokyo Kasei Kogyo Co., Ltd.)
$Fe(acac)_2$: Iron(II) acetylacetonate (manufactured by Aldrich Company)
$Zr(acac)_4$: Zirconium(IV) acetylacetonate (manufactured by Aldrich Company)
DBU: 1,8-diazabicyclo[5,4,0]undecene-7 (manufactured by Wako Pure Chemical Industries, Ltd.)
DBN: 1,5-diazabicyclo[4,3,0]nonene-5 (manufactured by Wako Pure Chemical Industries, Ltd.)
DBTDL: Dibutyltin dilaurate (manufactured by Tokyo Kasei Kogyo Co., Ltd.)
DEG: Diethylene glycol (manufactured by Wako Pure Chemical Industries, Ltd.)
HDI: Hexamethylene diisocyanate (manufactured by Tokyo Kasei Kogyo Co., Ltd.)

EXAMPLE 2

The same method as in Example 1 was employed except that as a metal complex catalyst, manganese(III) acetylacetonate ($Mn(acac)_3$) was used instead of manganese(II) acetylacetonate ($Mn(acac)_2$) in Example 1.

EXAMPLE 3

The same method as in Example 1 was employed except that as a metal complex catalyst, nickel(II) acetylacetonate was used instead of manganese(II) acetylacetonate in Example 1.

EXAMPLE 4

The same method as in Example 1 was employed except that as a metal complex catalyst, iron(II) acetylacetonate was used instead of manganese(II) acetylacetonate in Example 1.

EXAMPLE 5

The same method as in Example 1 was employed except that zirconium(IV) acetylacetonate was used instead of manganese(II) acetylacetonate in Example 1.

EXAMPLE 6

The same method as in Example 1 was employed except that as a bicyclic tertiary amine compound, 1,5-diazabicyclo [4,3,0]nonene-5 was used instead of 1,8-diazabicyclo[5,4,0] undecene-7 (DBU) in Example 1.

EXAMPLES 7 TO 9

The same method as in Example 1 was employed except that manganese(II) acetylacetonate as a metal complex catalyst and 1,8-diazabicyclo[5,4,0]undecene-7 (DBU) as a bicyclic tertiary amine compound, were used in a blend ratio as identified in Table 1.

COMPARATIVE EXAMPLES 1 TO 8

The same method as in Example 1 was employed except that as a catalyst, a metal complex catalyst or a bicyclic tertiary amine compound was used in the blend ratio as shown in Table 1.

The results are shown in Table 1.

In Examples 1 to 9, by the combination of the specific metal complex catalyst and the bicyclic tertiary amine compound, remarkable improvement in the catalytic activities was observed over the respective single systems (Comparative Examples 1 to 7), the urethane-forming reaction was synergistically accelerated, and a catalytic activity exceeding DBTDL as a tin catalyst, was obtained. On the other hand, in Comparative Example 8 which is an Example wherein a conventional catalyst DBTDL was used, DBTDL contains tributyltin as an impurity and can not safely be used from the viewpoint of the environmental hygiene, although the reaction rate constant is high.

EXAMPLE 10

20.5 g of a polyol, 19.5 g of a solvent (one preliminarily prepared so that toluene, ethyl acetate, butyl acetate and 1-methoxy-2-propanol acetate became 1/1/1/1 by a weight ratio), 0.008 g (0.03 mmol) of manganese(II) acetylacetonate ($Mn(acac)_2$) as a metal catalyst and 0.046 g (0.30 mmol) of 1,8-diazabicyclo[5,4,0]undecene-7 (DBU) as a bicyclic tertiary amine compound, were put in a polyethylene cup of 100 ml, followed by temperature adjustment to 20° C. A polyisocyanate having the temperature adjusted to 20° C. in a separate container, was added thereto in such an amount that the isocyanate index (isocyanate groups/OH groups (molar ratio)×100) became 100, followed by stirring for about one minute by a stirring rod. The mixed and stirred reaction solution was put into an oven having the temperature adjusted to 50° C., and the viscosity profile was measured by using a vibration type viscometer (Viscomate VM-1A-MH, manufactured by Yamaichi Denki K.K.). The time till the viscosity became 1,000 mPa·s, was taken as a pot life. Further, a reaction solution prepared in the same manner was molded so that the thickness became 1 cm, and cured at 20° C. for three days, whereupon the hardness (shore A) of the resin was measured. The results are shown in Table 2.

TABLE 2

| | Example No. | | | | | | | |
|---|---|---|---|---|---|---|---|---|
| | 10 | 11 | 12 | 13 | 14 | 15 | 16 | 17 |
| Polyol (pbw) | 100 | 100 | 100 | 100 | 100 | 100 | 100 | 100 |
| Solvent (pbw) | 95.3 | 95.3 | 95.3 | 95.3 | 95.3 | 95.3 | 95.3 | 95.3 |
| Catalyst (mmol) | | | | | | | | |
| $Mn(acac)_2$ | 0.03 | | | | | 0.03 | 0.03 | 0.03 |
| $Mn(acac)_3$ | | 0.03 | | | | | | |
| $Ni(acac)_2$ | | | 0.03 | | | | | |
| $Fe(acac)_2$ | | | | 0.03 | | | | |
| $Zr(acac)_4$ | | | | | 0.03 | | | |
| DBU | 0.30 | 0.30 | 0.30 | 0.30 | 0.30 | | 0.15 | 0.03 |
| DBN | | | | | | 0.30 | | |
| DBTDL | | | | | | | | |
| Isocyanate Index | 100 | 100 | 100 | 100 | 100 | 100 | 100 | 100 |
| Pot life (min) | 35 | 47 | 90 | 68 | 46 | 33 | 58 | 63 |
| Hardness (Shore A) | 54 | 53 | 53 | 51 | 51 | 53 | 51 | 52 |

| | Comparative Example No. | | | | | | | |
|---|---|---|---|---|---|---|---|---|
| | 9 | 10 | 11 | 12 | 13 | 14 | 15 | 16 |
| Polyol (pbw) | 100 | 100 | 100 | 100 | 100 | 100 | 100 | 100 |
| Solvent (pbw) | 95.3 | 95.3 | 95.3 | 95.3 | 95.3 | 95.3 | 95.3 | 95.3 |
| Catalyst (mmol) | | | | | | | | |
| $Mn(acac)_2$ | 0.03 | | | | | | | |
| $Mn(acac)_3$ | | 0.03 | | | | | | |
| $Ni(acac)_2$ | | | 0.03 | | | | | |
| $Fe(acac)_2$ | | | | 0.03 | | | | |
| $Zr(acac)_4$ | | | | | 0.03 | | | |
| DBU | | | | | | 0.30 | | |
| DBN | | | | | | | 0.30 | |
| DBTDL | | | | | | | | 0.03 |
| Isocyanate Index | 100 | 100 | 100 | 100 | 100 | 100 | 100 | 100 |
| Pot life (min) | 48 | 59 | >300 | 65 | 57 | >300 | >300 | 86 |
| Hardness (Shore A) | 50 | 51 | 22 | 48 | 45 | 15 | 12 | 52 |

Polyol: Hitaloid 3083-70B (manufactured by Hitachi Chemical Company, Ltd.)
Solvent: Toluene/ethyl acetate/butyl acetate/1-methoxy-2-propanol acetate = 1/1/1/1 (weight ratio)
$Mn(acac)_2$: Manganese(II) acetylacetonate (manufactured by Tokyo Kasei Kogyo Co., Ltd.)
$Mn(acac)_3$: Manganese(III) acetylacetonate (manufactured by Tokyo Kasei Kogyo Co., Ltd.)
$Ni(acac)_2$: Nickel(II) acetylacetonate (manufactured by Tokyo Kasei Kogyo Co., Ltd.)
$Fe(acac)_2$: Iron(II) acetylacetonate (manufactured by Aldrich Company)
$Zr(acac)_4$: Zirconium(IV) acetylacetonate (manufactured by Aldrich Company)
DBU: 1,8-diazabicyclo[5,4,0]undecene-7 (manufactured by Wako Pure Chemical Industries, Ltd.)
DBN: 1,5-diazabicyclo[4,3,0]nonene-5 (manufactured by Wako Pure Chemical Industries, Ltd.)
DBTDL: Dibutyltin dilaurate (manufactured by Tokyo Kasei Kogyo Co., Ltd.)
Isocyanate: Coronate HX (manufactured by Nippon Polyurethane Industry Co., Ltd.), Index = (NCO group mol number/OH groups mol number) × 100

EXAMPLES 11 TO 17

The same method as in Example 10 was employed except that the metal complex catalyst and the bicyclic tertiary amine compound were used in the blend ratio as shown in Table 2. The results are also shown in Table 2.

COMPARATIVE EXAMPLES 9 TO 16

The same method as in Example 10 was employed except that the metal complex catalyst or the bicyclic tertiary amine compound was used in the blend ratio as shown in Table 2. The results are also shown in Table 2.

As is evident from Table 2, in Examples 10 to 17, by the combination of the metal complex catalyst and the bicyclic tertiary amine compound, shortening of the pot life is observed as compared with the respective single systems (Comparative Examples 9 to 15) or DBTDL as a tin catalyst (Comparative Example 16), and they are catalytic systems excellent in curing properties. Further, the hardness of the polyurethane resins molded by the catalyst of the present invention was at a level equal to DBTDL and thus is practically useful.

EXAMPLE 18

(1) Preparation of Catalyst

In an argon atmosphere, into a Shlenk tube having a magnetic stirrer introduced, 0.05 g (0.20 mmol) of iron(II) acetylacetonate ($Fe(acac)_2$) as a metal complex catalyst, and 0.04 g (0.20 mmol) of isophorone diisocyanate (hereinafter sometimes referred to as IPDI) as a compound having a cumulative double bond, were charged, and 10 ml of N,N-dimethylformamide (hereinafter sometimes referred to as DMF) was added. This mixed solution was stirred at room temperature for 24 hours to obtain a metal complex isocyanate catalyst.

(2) Method for Measuring the Reaction Rate Constant of an Isocyanate with an Alcohol Into a 20 ml Shlenk tube preliminarily flushed with argon, 0.54 g (4.00 mmol) of hexamethylene diisocyanate (HDI) was charged, and 10 ml of N,N-dimethylformamide (hereinafter sometimes referred to as DMF) was added thereto to prepare a HDI-DMF solution. On the other hand, into a three necked flask of 300 ml flushed with argon, 0.425 g (4.00 mmol) of ethylene glycol (hereinafter sometimes referred to as DEG) and DMF (about 30 ml) were introduced to prepare a DEG-DMF solution. The HDI-DMF solution, the DEG-DMF solution, and the metal complex isocyanate catalyst were respectively stirred for 30 minutes at 30° C., and then, the HDI-DMF solution and the metal complex isocyanate catalyst was added to the three necked flask containing the DEG-DMF solution by means of cannula, whereupon the reaction was initiated with stirring. After initiation of the reaction, about 5 ml of the reaction solution was sampled every from 5 to 10 minutes, and an unreacted isocyanate was reacted with a di-n-butylamine (hereinafter sometimes referred to as DBA) solution, and the remaining DBA was back-titrated with a 0.5 N hydrochloric acid standard solution to quantify the unreacted isocyanate amount.

The reaction rate constant k (1/mol·hr) was obtained on the assumption that the reaction of an isocyanate and an alcohol is primary to the respective concentrations. Further, the rate constant Kc ($l^2$/eq·mol·hr) per catalyst was obtained by dividing the reaction rate constant k by the catalyst concentration. The results are shown in Table 3.

TABLE 3

| | Example No. | | | | | | | |
|---|---|---|---|---|---|---|---|---|
| | 18 | 19 | 20 | 21 | 22 | 23 | 24 | 25 |
| Catalyst (mmol) | | | | | | | | |
| $Fe(acac)_2$ | 0.2 | | | | | | 0.2 | 0.2 |
| $Fe(acac)_3$ | | 0.2 | | | | | | |
| $Mn(acac)_2$ | | | 0.2 | | | | | |
| $Mn(acac)_3$ | | | | 0.2 | | | | |
| $Co(acac)_2$ | | | | | 0.2 | | | |
| $Zr(acac)_4$ | | | | | | 0.2 | | |
| IPDI | 0.2 | 0.2 | 0.2 | 0.2 | 0.2 | 0.2 | | |
| H6XDI | | | | | | | 0.2 | |
| XDI | | | | | | | | 0.2 |
| DBTDL | | | | | | | | |
| Alcohol (mmol) | | | | | | | | |
| DEG | 4.0 | 4.0 | 4.0 | 4.0 | 4.0 | 4.0 | 4.0 | 4.0 |
| Isocyanate (mmol) | | | | | | | | |
| HDI | 4.0 | 4.0 | 4.0 | 4.0 | 4.0 | 4.0 | 4.0 | 4.0 |
| Reaction rate constant | | | | | | | | |
| Kc($l^2$/eq · mol · h) | 40889 | 32710 | 7917 | 8710 | 7444 | 29870 | 34750 | 16111 |

| | Comparative Example No. | | | | | | | | | |
|---|---|---|---|---|---|---|---|---|---|---|
| | 17 | 18 | 19 | 20 | 21 | 22 | 23 | 24 | 25 | 26 |
| Catalyst (mmol) | | | | | | | | | | |
| $Fe(acac)_2$ | 0.2 | | | | | | | | | |
| $Fe(acac)_3$ | | 0.2 | | | | | | | | |
| $Mn(acac)_2$ | | | 0.2 | | | | | | | |
| $Mn(acac)_3$ | | | | 0.2 | | | | | | |
| $Co(acac)_2$ | | | | | 0.2 | | | | | |
| $Zr(acac)_4$ | | | | | | 0.2 | | | | |
| IPDI | | | | | | | 0.2 | | | |
| H6XDI | | | | | | | | 0.2 | | |
| XDI | | | | | | | | | 0.2 | |
| DBTDL | | | | | | | | | | 0.2 |
| Alcohol (mmol) | | | | | | | | | | |
| DEG | 4.0 | 4.0 | 4.0 | 4.0 | 4.0 | 4.0 | 4.0 | 4.0 | 4.0 | 4.0 |
| Isocyanate (mmol) | | | | | | | | | | |
| HDI | 4.0 | 4.0 | 4.0 | 4.0 | 4.0 | 4.0 | 4.0 | 4.0 | 4.0 | 4.0 |
| Reaction rate constant | | | | | | | | | | |
| Kc($l^2$/eq · mol · h) | 7472 | 5980 | 3125 | 3500 | 3264 | 5560 | Unreacted | Unreacted | Unreacted | 15097 |

$Fe(acac)_2$: Iron(II) acetylacetonate (manufactured by Aldrich Company)
$Fe(acac)_3$: Iron(III) acetylacetonate (manufactured by Aldrich Company)
$Mn(acac)_2$: Manganese(II) acetylacetonate (manufactured by Nacalai Tesque, Inc.)
$Mn(acac)_3$: Manganese(III) acetylacetonate (manufactured by Aldrich Company)
$Co(acac)_2$: Cobalt(II) acetylacetonate (manufactured by Nacalai Tesque, Inc.)
$Zr(acac)_4$: Zirconium(IV) acetylacetonate (manufactured by Aldrich Company)
IPDI: Isophorone diisocyanate (manufactured by Wako Pure Chemical Industries, Ltd.)
H6XDI: 1,3-bis(isocyanate methyl)cyclohexane (manufactured by Takeda Chemical Industries, Ltd.)
XDI: Xylene diisocyanate (manufactured by Takeda Chemical Industries, Ltd.)
DBTDL: Dibutyltin dilaurate (manufactured by Nacalai Tesque, Inc.)
DEG: Diethylene glycol (manufactured by Nacalai Tesque, Inc.)
HDI: Hexamethylene diisocyanate (manufactured by Nippon Polyurethane Industry Co., Ltd.)

EXAMPLE 19

The same method as in Example 18 was employed except that as a metal complex catalyst, iron(III) acetylacetonate was used instead of iron(II) acetylacetonate in Example 18. The results are also shown in Table 3.

EXAMPLE 20

The same method as in Example 18 was employed except that as a metal complex catalyst, manganese(II) acetylacetonate was used instead of iron(II) acetylacetonate in Example 18. The results are also shown in Table 3.

EXAMPLE 21

The same method as in Example 18 was employed except that as a metal complex catalyst, manganese(III) acetylacetonate was used instead of iron(II) acetylacetonate in Example 18. The results are also shown in Table 3.

EXAMPLE 22

The same method as in Example 18 was employed except that as a metal complex catalyst, cobalt(II) acetylacetonate was used instead of iron(II) acetylacetonate in Example 18. The results are also shown in Table 3.

EXAMPLE 23

The same method as in Example 18 was employed except that as a metal complex catalyst, zirconium(IV) acetylacetonate was used instead of iron(II) acetylacetonate in Example 18. The results are also shown in Table 3.

EXAMPLE 24

The same method as in Example 18 was employed except that as a compound having a cumulative double bond, 1,3-bis(isocyanate methyl)cyclohexane (H6XDI) was used instead of isophorone diisocyanate (IPDI) in Example 18. The results are also shown in Table 3.

EXAMPLE 25

The same method as in Example 18 was employed except that as a compound having a cumulative double bond, xylene diisocyanate (XDI) was used instead of isophorone diisocyanate (IPDI) in Example 18. The results are also shown in Table 3.

COMPARATIVE EXAMPLES 17 TO 26

The same method as in Example 18 was employed except that as a catalyst, a metal complex catalyst or a compound having a cumulative double bond was used in a blend ratio as shown in Table 3.

The results are shown in Table 2.

As is evident from Table 2, in Examples 18 to 25, by using a composition prepared by preliminarily mixing the specific metal complex catalyst and the compound having a cumulative double bond, remarkable improvement in the catalytic activities was observed over the respective single systems (Comparative Examples 17 to 25), the urethane-forming reaction was synergistically accelerated, and a catalytic activity comparable to DBTDL as a tin catalyst, was obtained.

On the other hand, in Comparative Example 26 which is an Example wherein a conventional catalyst DBTDL was used, DBTDL contains tributyltin as an impurity and can not safely be used from the viewpoint of the environmental hygiene, although the reaction rate constant is high.

EXAMPLE 26

(1) Preparation of Catalyst 7.62 mg (0.03 mmol) of iron(II) acetylacetonate ($Fe(acac)_2$) as a metal complex catalyst, and 66.7 mg (0.30 mmol) of isophorone diisocyanate (hereinafter sometimes referred to as IPDI) as a compound having a cumulative double bond, were charged, and 2 ml of N,N-dimethylformamide (hereinafter sometimes referred to as DMF) was added. This mixed solution was stirred at room temperature for 24 hours to obtain a metal complex isocyanate catalyst.

(2) Reaction of a Polyol and an Isocyanate 20.5 g of a polyol, 19.5 g of a solvent (one preliminarily prepared so that toluene, ethyl acetate, butyl acetate and 1-methoxy-2-propanol acetate became 1/1/1/1 by a weight ratio) and a metal complex isocyanate catalyst were put in a polyethylene cup of 100 ml, followed by temperature adjustment to 20° C. A polyisocyanate having the temperature adjusted to 20° C. in a separate container, was added thereto in such an amount that the isocyanate index (isocyanate groups/OH groups (molar ratio)×100) became 100, followed by stirring for about one minute by a stirring rod. The mixed and stirred reaction solution was put into an oven having the temperature adjusted to 50° C., and the viscosity profile was measured by using a vibration type viscometer (Viscomate VM-1A-MH, manufactured by Yamaichi Denki K.K.). The time till the viscosity became 1,000 mPa·s, was taken as a pot life. Further, a reaction solution prepared in the same manner was molded so that the thickness became 1 cm, and cured at 20° C. for three days, whereupon the hardness (shore A) of the resin was measured. The results are shown in Table 4.

TABLE 4

| | Example No. | | | | | | | | | |
|---|---|---|---|---|---|---|---|---|---|---|
| | 26 | 27 | 28 | 29 | 30 | 31 | 32 | 33 | 34 | 35 |
| Polyol (pbw) | 100 | 100 | 100 | 100 | 100 | 100 | 100 | 100 | 100 | 100 |
| Solvent (pbw) | 95.3 | 95.3 | 95.3 | 95.3 | 95.3 | 95.3 | 95.3 | 95.3 | 95.3 | 95.3 |
| Catalyst (mmol) | | | | | | | | | | |
| $Fe(acac)_2$ | 0.03 | | | | | | 0.03 | 0.03 | 0.03 | 0.03 |
| $Fe(acac)_3$ | | 0.03 | | | | | | | | |
| $Mn(acac)_2$ | | | 0.03 | | | | | | | |
| $Mn(acac)_3$ | | | | 0.03 | | | | | | |
| $Co(acac)_2$ | | | | | 0.03 | | | | | |
| $Zr(acac)_4$ | | | | | | 0.03 | | | | |

TABLE 4-continued

| | | | | | | | | | | |
|---|---|---|---|---|---|---|---|---|---|---|
| IPDI | 0.30 | 0.30 | 0.30 | 0.30 | 0.30 | 0.30 | | | 0.15 | 0.03 |
| H6XDI | | | | | | | 0.30 | | | |
| XDI | | | | | | | | 0.30 | | |
| DBTDL | | | | | | | | | | |
| Isocyanate Index | 100 | 100 | 100 | 100 | 100 | 100 | 100 | 100 | 100 | 100 |
| Pot life (min) | 14 | 18 | 33 | 53 | 30 | 18 | 16 | 29 | 24 | 43 |
| Hardness (Shore A) | 51 | 54 | 52 | 50 | 51 | 50 | 52 | 52 | 51 | 51 |

| | Comparative Example No. | | | | | | | | | |
|---|---|---|---|---|---|---|---|---|---|---|
| | 27 | 28 | 29 | 30 | 31 | 32 | 33 | 34 | 35 | 36 |
| Polyol (pbw) | 100 | 100 | 100 | 100 | 100 | 100 | 100 | 100 | 100 | 100 |
| Solvent (pbw) | 95.3 | 95.3 | 95.3 | 95.3 | 95.3 | 95.3 | 95.3 | 95.3 | 95.3 | 95.3 |
| Catalyst (mmol) | | | | | | | | | | |
| $Fe(acac)_2$ | 0.03 | | | | | | | | | |
| $Fe(acac)_3$ | | 0.03 | | | | | | | | |
| $Mn(acac)_2$ | | | 0.03 | | | | | | | |
| $Mn(acac)_3$ | | | | 0.03 | | | | | | |
| $Co(acac)_2$ | | | | | 0.03 | | | | | |
| $Zr(acac)_4$ | | | | | | 0.03 | | | | |
| IPDI | | | | | | | 0.30 | | | |
| H6XDI | | | | | | | | 0.30 | | |
| XDI | | | | | | | | | 0.30 | |
| DBTDL | | | | | | | | | | 0.03 |
| Isocyanate Index | 100 | 100 | 100 | 100 | 100 | 100 | 100 | 100 | 100 | 100 |
| Pot life (min) | 65 | 25 | 48 | 59 | 92 | 57 | >300 | >300 | >300 | 86 |
| Hardness (Shore A) | 48 | 50 | 50 | 51 | 43 | 45 | 8 | 10 | 7 | 52 |

Polyol: Hitaloid 3083-70B (manufactured by Hitachi Chemical Company, Ltd.)
Solvent: Toluene/ethyl acetate/butyl acetate/1-methoxy-2-propanol acetate = 1/1/1/1 (weight ratio)
$Fe(acac)_2$: Iron(II) acetylacetonate (manufactured by Aldrich Company)
$Fe(acac)_3$: Iron(III) acetylacetonate (manufactured by Aldrich Company)
$Mn(acac)_2$: Manganese(II) acetylacetonate (manufactured by Nacalai Tesque, Inc.)
$Mn(acac)_3$: Manganese(III) acetylacetonate (manufactured by Aldrich Company)
$Co(acac)_2$: Cobalt(II) acetylacetonate (manufactured by Nacalai Tesque, Inc.)
$Zr(acac)_4$: Zirconium(IV) acetylacetonate (manufactured by Aldrich Company)
IPDI: Isophorone diisocyanate (manufactured by Wako Pure Chemical Industries, Ltd.)
H6XDI: 1,3-bis(isocyanate methyl)cyclohexane (manufactured by Takeda Chemical Industries, Ltd.)
XDI: Xylene diisocyanate (manufactured by Takeda Chemical Industries, Ltd.)
DBTDL: Dibutyltin dilaurate (manufactured by Tokyo Kasei Kogyo Co., Ltd.)
Isocyanate: Coronate HX (manufactured by Nippon Polyurethane Industry Co., Ltd.), Index = (NCO group mol number/OH groups mol number) × 100

EXAMPLES 27 TO 35

The same method as in Example 26 was employed except that the metal complex catalyst and the compound having the cumulative double bond were used in the blend ratio as shown in Table 4. The results are also shown in Table 4.

COMPARATIVE EXAMPLES 27 TO 36

The same method as in Example 26 was employed except that the metal complex catalyst or the compound having the cumulative double bond was used in the blend ratio as shown in Table 4. The results are also shown in Table 4.

As is evident from Table 4, in Examples 26 to 35, by the combination of the metal complex catalyst and the compound having the cumulative double bond, shortening of the pot life is observed as compared with the respective single systems (Comparative Examples 27 to 35) or DBTDL as a tin catalyst (Comparative Example 36), and they are catalytic systems excellent in curing properties. Further, the hardness of the polyurethane resins molded by the catalyst of the present invention was at a level equal to DBTDL and thus is practically useful.

EXAMPLE 36

Into a 200 ml Erlenmeyer flask flushed with nitrogen, 0.008 g (0.03 mmol) of manganese(II) acetylacetonate (Mn (acac) 2) as a metal complex catalyst, 0.006 g (0.03 mmol) of methyltriethylammonium methyl carbonate as a quaternary ammonium salt compound and 1.10 g (10.4 mmol) of diethylene glycol (DEG) were charged, and 50 ml of N,N-dimethylformamide (DMF) was added to prepare a DEG-DMF solution. Further, into a 100 ml Erlenmeyer flask flushed with nitrogen, 1.42 g (10.4 mmol) of hexamethylene diisocyanate (HDI) was introduced, and 50 ml of N,N-dimethylformamide (DMF) was added thereto to prepare a HDI-DMF solution. The DEG-DMF solution and the HDI-DMF solution were, respectively, stirred for 30 minutes at 30° C., whereupon the HDI-DMF solution was added to the DEG-DMF solution, and the reaction was initiated with stirring. After initiation of the reaction, about 10 ml of the reaction solution was sampled every from 20 to 30 minutes, and an unreacted isocyanate was reacted with an excess di-n-butylamine (DBA) solution, and the remaining DBA was back-titrated with a 0.5 N hydrochloric acid standard solution to quantify the unreacted isocyanate amount.

The reaction rate constant k (1/mol·hr) was obtained on the assumption that the reaction of an isocyanate and an alcohol is primary to the respective concentrations. Further, the rate constant Kc ($1^2$/eq·mol·hr) per catalyst was obtained by dividing the reaction rate constant k by the catalyst concentration. The results are shown in Table 5.

TABLE 5

| | Example No. | | | | | | | | |
|---|---|---|---|---|---|---|---|---|---|
| | 36 | 37 | 38 | 39 | 40 | 41 | 42 | 43 | 44 |
| Catalyst (mmol) | | | | | | | | | |
| $Mn(acac)_2$ | 0.03 | 0.03 | 0.03 | 0.03 | 0.03 | 0.03 | | | |
| $Mn(acac)_3$ | | | | | | | 0.03 | 0.03 | |
| $Fe(acac)_2$ | | | | | | | | | 0.03 |
| $Ni(acac)_2$ | | | | | | | | | |
| $Zr(acac)_4$ | | | | | | | | | |
| Catalyst A | 0.03 | | | | | | 0.03 | | 0.03 |
| Catalyst B | | 0.03 | | | | | | | |
| Catalyst C | | | 0.03 | | | | | | |
| Catalyst D | | | | 0.03 | | | | 0.03 | |
| Catalyst E | | | | | 0.03 | | | | |
| Catalyst F | | | | | | 0.03 | | | |
| Isocyanate (mmol) | | | | | | | | | |
| HDI | 10.4 | 10.4 | 10.4 | 10.4 | 10.4 | 10.4 | 10.4 | 10.4 | 10.4 |
| Alcohol (mmol) | | | | | | | | | |
| DEG | 10.4 | 10.4 | 10.4 | 10.4 | 10.4 | 10.4 | 10.4 | 10.4 | 10.4 |
| Reaction rate constant | | | | | | | | | |
| $Kc(l^2/eq \cdot mol \cdot h)$ | 36688 | 27831 | 30486 | 39431 | 39048 | 35488 | 32871 | 35329 | 22004 |
| | Example No. | | | | | | | | |
| | 45 | 46 | 47 | 48 | 49 | 50 | 51 | 52 | 53 |
| Catalyst (mmol) | | | | | | | | | |
| $Mn(acac)_2$ | | | | | | 0.012 | 0.02 | 0.04 | 0.048 |
| $Mn(acac)_3$ | | | | | | | | | |
| $Fe(acac)_2$ | 0.03 | | | | | | | | |
| $Ni(acac)_2$ | | 0.03 | 0.03 | | | | | | |
| $Zr(acac)_4$ | | | | 0.03 | 0.03 | | | | |
| Catalyst A | | 0.03 | | 0.03 | | | | | |
| Catalyst B | | | | | | | | | |
| Catalyst C | | | | | | | | | |
| Catalyst D | 0.03 | | 0.03 | | 0.03 | 0.048 | 0.04 | 0.02 | 0.012 |
| Catalyst E | | | | | | | | | |
| Catalyst F | | | | | | | | | |
| Isocyanate (mmol) | | | | | | | | | |
| HDI | 10.4 | 10.4 | 10.4 | 10.4 | 10.4 | 10.4 | 10.4 | 10.4 | 10.4 |
| Alcohol (mmol) | | | | | | | | | |
| DEG | 10.4 | 10.4 | 10.4 | 10.4 | 10.4 | 10.4 | 10.4 | 10.4 | 10.4 |
| Reaction rate constant | | | | | | | | | |
| $Kc(l^2/eq \cdot mol \cdot h)$ | 23650 | 22559 | 24246 | 26846 | 28480 | 23861 | 27300 | 23286 | 21258 |

$Mn(acac)_2$: Manganese(II) acetylacetonate (manufactured by Aldrich Company)
$Mn(acac)_3$: Manganese(III) acetylacetonate (manufactured by Aldrich Company)
$Fe(acac)_2$: Iron(II) acetylacetonate (manufactured by Aldrich Company)
$Ni(acac)_2$: Nickel(II) acetylacetonate (manufactured by Aldrich Company)
$Zr(acac)_4$: Zirconium(IV) acetylacetonate (manufactured by Aldrich Company)
Catalyst A: Methyltriethylammonium methyl carbonate (a product obtained by reacting dimethyl carbonate to triethylamine)
Catalyst B: Methyltriethylammonium methyl octylate (product prepared by adding octylic acid to catalyst A).
Catalyst C: 1-methyl-1-azania-4-azabicyclo[2,2,2]octanium methyl carbonate (product obtained by reacting dimethyl carbonate to triethylenediamine)
Catalyst D: Dodecyltrimethylammonium methyl carbonate (product obtained by reacting dimethyl carbonate to N,N-dimethyldodecylamine)
Catalyst E: Octyltrimethylammonium methyl carbonate (product obtained by reacting dimethyl carbonate to N,N-dimethyloctylamine)
Catalyst F: Dodecyltrimethylammonium carbonate (product obtained by reacting dimethyl carbonate to N,N-dimethyldodecylamine)
HDI: Hexamethylene diisocyanate (manufactured by Tokyo Kasei Kogyo Co., Ltd.)
DEG: Diethylene glycol (manufactured by Kishida Chemical Co., Ltd.)

EXAMPLES 37 TO 53

The same method as in Example 36 was employed except that as a catalyst, the metal complex catalyst and the quaternary ammonium salt compound were used in the blend ratio as identified in Table 5. The results are also shown in Table 5.

COMPARATIVE EXAMPLES 37 TO 48

The same method as in Example 36 was employed except that as a catalyst, the metal complex catalyst or the quaternary ammonium salt compound was used in the blend ratio as identified in Table 6. The results are shown in Table 6.

EXAMPLE 54

20.5 g of a polyol, 19.5 g of a solvent (one preliminarily prepared so that toluene, ethyl acetate, butyl acetate and 1-methoxy-2-propanol acetate became 1/1/1/1 by a weight ratio), 7.59 mg (0.03 mmol) of a manganese(II) acetylacetonate ($Mn(acac)_2$) as a metal catalyst, 57.38 mg (0.30 mmol) of a methyltriethylammonium methyl carbonate as a quaternary ammonium salt compound were put in a polyethylene cup of 100 ml, followed by temperature adjustment to 20° C. A polyisocyanate having the temperature adjusted to 20° C. in a separate container, was added thereto in such an amount that the isocyanate index (isocyanate groups/OH groups (molar ratio)×100) became 100, followed by stirring for about one minute by a stirring rod. The mixed and stirred reaction solution was put into an oven having the temperature adjusted to 50° C., and the viscosity profile was measured by using a vibration type viscometer (Viscomate VM-1A-MH, manufactured by Yamaichi Denki K.K.). The time till the viscosity became 1,000 mPa·s, was taken as a pot life. Further, a reaction solution prepared in the same manner was molded so that the thickness became 1 cm, and cured at 20° C. for three days, whereupon the hardness (shore A) of the resin was measured. The results are shown in Table 7.

TABLE 6

| | Comparative Example No. | | | | | | | | | | | |
|---|---|---|---|---|---|---|---|---|---|---|---|---|
| | 37 | 38 | 39 | 40 | 41 | 42 | 43 | 44 | 45 | 46 | 47 | 48 |
| Catalyst (mmol) | | | | | | | | | | | | |
| $Mn(acac)_2$ | 0.06 | | | | | | | | | | | |
| $Mn(acac)_3$ | | 0.06 | | | | | | | | | | |
| $Fe(acac)_2$ | | | 0.06 | | | | | | | | | |
| $Ni(acac)_2$ | | | | 0.06 | | | | | | | | |
| $Zr(acac)_4$ | | | | | 0.06 | | | | | | | |
| Catalyst A | | | | | | 0.06 | | | | | | |
| Catalyst B | | | | | | | 0.06 | | | | | |
| Catalyst C | | | | | | | | 0.06 | | | | |
| Catalyst D | | | | | | | | | 0.06 | | | |
| Catalyst E | | | | | | | | | | 0.06 | | |
| Catalyst F | | | | | | | | | | | 0.06 | |
| DBTDL | | | | | | | | | | | | 0.06 |
| Isocyanate (mmol) | | | | | | | | | | | | |
| HDI | 10.4 | 10.4 | 10.4 | 10.4 | 10.4 | 10.4 | 10.4 | 10.4 | 10.4 | 10.4 | 10.4 | 10.4 |
| Alcohol (mmol) | | | | | | | | | | | | |
| DEG | 10.4 | 10.4 | 10.4 | 10.4 | 10.4 | 10.4 | 10.4 | 10.4 | 10.4 | 10.4 | 10.4 | 10.4 |
| Reaction rate constant | | | | | | | | | | | | |
| $Kc(l^2/eq \cdot mol \cdot h)$ | 28525 | 18950 | 3865 | 22929 | 24576 | 10012 | 2842 | 7898 | 7534 | 6668 | 6780 | 27437 |

$Mn(acac)_2$: Manganese(II) acetylacetonate (manufactured by Aldrich Company)
$Mn(acac)_3$: Manganese(III) acetylacetonate (manufactured by Aldrich Company)
$Fe(acac)_2$: Iron(II) acetylacetonate (manufactured by Aldrich Company)
$Ni(acac)_2$: Nickel(II) acetylacetonate (manufactured by Aldrich Company)
$Zr(acac)_4$: Zirconium(IV) acetylacetonate (manufactured by Aldrich Company)
Catalyst A: Methyltriethylammonium methyl carbonate (a product obtained by reacting dimethyl carbonate to triethylamine)
Catalyst B: Methyltriethylammonium methyl octylate (product prepared by adding octylic acid to catalyst A).
Catalyst C: 1-methyl-1-azania-4-azabicyclo[2,2,2]octanium methyl carbonate (product obtained by reacting dimethyl carbonate to triethylenediamine)
Catalyst D: Dodecyltrimethylammonium methyl carbonate (product obtained by reacting dimethyl carbonate to N,N-dimethyldodecylamine)
Catalyst E: Octyltrimethylammonium methyl carbonate (product obtained by reacting dimethyl carbonate to N,N-dimethyloctylamine)
Catalyst F: Dodecyltrimethylammonium carbonate (product obtained by reacting dimethyl carbonate to N,N-dimethyldodecylamine)
DBTDL: Dibutyltin dilaurate (manufactured by Tokyo Kasei Kogyo Co., Ltd.)
HDI: Hexamethylene diisocyanate (manufactured by Tokyo Kasei Kogyo Co., Ltd.)
DEG: Diethylene glycol (manufactured by Kishida Chemical Co., Ltd.)

As is evident from Tables 5 and 6, in Examples 36 to 53, by the combination of the specific metal complex catalyst and the quaternary ammonium salt compound, remarkable improvement in the catalytic activities was observed over the respective single systems (Comparative Examples 37 to 47), the urethane-forming reaction was synergistically accelerated, and a catalytic activity equal to or higher than the catalytic activity of DBTDL as a tin catalyst was obtained. On the other hand, in Comparative Example 48 which is an Example wherein a conventional catalyst DBTDL was used, DBTDL contains tributyltin as an impurity and can not safely be used from the viewpoint of the environmental hygiene, although the reaction rate constant is high.

TABLE 7

| | Example No. | | | | | | | | | | | |
|---|---|---|---|---|---|---|---|---|---|---|---|---|
| | 54 | 55 | 56 | 57 | 58 | 59 | 60 | 61 | 62 | 63 | 64 | 65 |
| Polyol (pbw) | 100 | 100 | 100 | 100 | 100 | 100 | 100 | 100 | 100 | 100 | 100 | 100 |
| Solvent (pbw) | 95.3 | 95.3 | 95.3 | 95.3 | 95.3 | 95.3 | 95.3 | 95.3 | 95.3 | 95.3 | 95.3 | 95.3 |
| Catalyst (mmol) | | | | | | | | | | | | |
| $Mn(acac)_2$ | 0.03 | 0.03 | 0.03 | 0.03 | 0.03 | 0.03 | | | | | 0.03 | 0.03 |
| $Mn(acac)_3$ | | | | | | | 0.03 | | | | | |
| $Fe(acac)_2$ | | | | | | | | 0.03 | | | | |
| $Ni(acac)_2$ | | | | | | | | | 0.03 | | | |
| $Zr(acac)_4$ | | | | | | | | | | 0.03 | | |
| Catalyst A | 0.30 | | | | | | 0.30 | 0.30 | 0.30 | 0.30 | 0.15 | 0.03 |
| Catalyst B | | 0.30 | | | | | | | | | | |
| Catalyst C | | | 0.30 | | | | | | | | | |
| Catalyst D | | | | 0.30 | | | | | | | | |
| Catalyst E | | | | | 0.30 | | | | | | | |
| Catalyst F | | | | | | 0.30 | | | | | | |
| Isocyanate Index | 100 | 100 | 100 | 100 | 100 | 100 | 100 | 100 | 100 | 100 | 100 | 100 |
| Pot life (min) | 22 | 35 | 30 | 20 | 22 | 28 | 29 | 27 | 43 | 38 | 35 | 41 |
| Hardness (Shore A) | 53 | 52 | 54 | 52 | 53 | 51 | 50 | 50 | 48 | 52 | 52 | 51 |

Polyol: Hitaloid 3083-70B (manufactured by Hitachi Chemical Company, Ltd.)
Solvent: Toluene/ethyl acetate/butyl acetate/1-methoxy-2-propanol acetate = 1/1/1/1 (weight ratio)
$Mn(acac)_2$: Manganese(II) acetylacetonate (manufactured by Aldrich Company)
$Mn(acac)_3$: Manganese(III) acetylacetonate (manufactured by Aldrich Company)
$Fe(acac)_2$: Iron(II) acetylacetonate (manufactured by Aldrich Company)
$Ni(acac)_2$: Nickel(II) acetylacetonate (manufactured by Aldrich Company)
$Zr(acac)_4$: Zirconium(IV) acetylacetonate (manufactured by Aldrich Company)
Catalyst A: Methyltriethylammonium methyl carbonate (a product obtained by reacting dimethyl carbonate to triethylamine)
Catalyst B: Methyltriethylammonium methyl octylate (product prepared by adding octylic acid to catalyst A).
Catalyst C: 1-methyl-1-azania-4-azabicyclo[2,2,2]octanium methyl carbonate (product obtained by reacting dimethyl carbonate to triethylenediamine)
Catalyst D: Dodecyltrimethylammonium methyl carbonate (product obtained by reacting dimethyl carbonate to N,N-dimethyldodecylamine)
Catalyst E: Octyltrimethylammonium methyl carbonate (product obtained by reacting dimethyl carbonate to N,N-dimethyloctylamine)
Catalyst F: Dodecyltrimethylammonium carbonate (product obtained by reacting dimethyl carbonate to N,N-dimethyldodecylamine)
Isocyanate: Coronate HX (manufactured by Nippon Polyurethane Industry Co., Ltd.), Index = (NCO group mol number/OH groups mol number) × 100

EXAMPLES 55 TO 65

The same method as in Example 54 was employed except that the metal complex catalyst and the quaternary ammonium salt compound were used in the blend ratio as shown in Table 7. The results are also shown in Table 7.

COMPARATIVE EXAMPLES 49 TO 60

The same method as in Example 54 was employed except that the metal complex catalyst or the quaternary ammonium salt compound was used in the blend ratio as shown in Table 8. The results are also shown in Table 8.

TABLE 8

| | Comparative Example No. | | | | | | | | | | | |
|---|---|---|---|---|---|---|---|---|---|---|---|---|
| | 49 | 50 | 51 | 52 | 53 | 54 | 55 | 56 | 57 | 58 | 59 | 60 |
| Polyol (pbw) | 100 | 100 | 100 | 100 | 100 | 100 | 100 | 100 | 100 | 100 | 100 | 100 |
| Solvent (pbw) | 95.3 | 95.3 | 95.3 | 95.3 | 95.3 | 95.3 | 95.3 | 95.3 | 95.3 | 95.3 | 95.3 | 95.3 |
| Catalyst (mmol) | | | | | | | | | | | | |
| $Mn(acac)_2$ | 0.03 | | | | | | | | | | | |
| $Mn(acac)_3$ | | 0.03 | | | | | | | | | | |
| $Fe(acac)_2$ | | | 0.03 | | | | | | | | | |
| $Ni(acac)_2$ | | | | 0.03 | | | | | | | | |
| $Zr(acac)_4$ | | | | | 0.03 | | | | | | | |
| Catalyst A | | | | | | 0.30 | | | | | | |
| Catalyst B | | | | | | | 0.30 | | | | | |
| Catalyst C | | | | | | | | 0.30 | | | | |
| Catalyst D | | | | | | | | | 0.30 | | | |
| Catalyst E | | | | | | | | | | 0.30 | | |
| Catalyst F | | | | | | | | | | | 0.30 | |
| DBTDL | | | | | | | | | | | | 0.03 |
| Isocyanate Index | 100 | 100 | 100 | 100 | 100 | 100 | 100 | 100 | 100 | 100 | 100 | 100 |

TABLE 8-continued

| | Comparative Example No. | | | | | | | | | | | |
|---|---|---|---|---|---|---|---|---|---|---|---|---|
| | 49 | 50 | 51 | 52 | 53 | 54 | 55 | 56 | 57 | 58 | 59 | 60 |
| Pot life (min) | 48 | 59 | 65 | 75 | 57 | >300 | >300 | >300 | >300 | >300 | >300 | 86 |
| Hardness (Shore A) | 50 | 51 | 48 | 40 | 45 | 7 | 5 | 6 | 5 | 7 | 6 | 52 |

Polyol: Hitaloid 3083-70B (manufactured by Hitachi Chemical Company, Ltd.)
Solvent: Toluene/ethyl acetate/butyl acetate/1-methoxy-2-propanol acetate = 1/1/1/1 (weight ratio)
$Mn(acac)_2$: Manganese(II) acetylacetonate (manufactured by Aldrich Company)
$Mn(acac)_3$: Manganese(III) acetylacetonate (manufactured by Aldrich Company)
$Fe(acac)_2$: Iron(II) acetylacetonate (manufactured by Aldrich Company)
$Ni(acac)_2$: Nickel(II) acetylacetonate (manufactured by Aldrich Company)
$Zr(acac)_4$: Zirconium(IV) acetylacetonate (manufactured by Aldrich Company)
Catalyst A: Methyltriethylammonium methyl carbonate (a product obtained by reacting dimethyl carbonate to triethylamine)
Catalyst B: Methyltriethylammonium methyl octylate (product prepared by adding octylic acid to catalyst A).
Catalyst C: 1-methyl-1-azania-4-azabicyclo[2,2,2]octanium methyl carbonate (product obtained by reacting dimethyl carbonate to triethylenediamine)
Catalyst D: Dodecyltrimethylammonium methyl carbonate (product obtained by reacting dimethyl carbonate to N,N-dimethyldodecylamine)
Catalyst E: Octyltrimethylammonium methyl carbonate (product obtained by reacting dimethyl carbonate to N,N-dimethyloctylamine)
Catalyst F: Dodecyltrimethylammonium carbonate (product obtained by reacting dimethyl carbonate to N,N-dimethyldodecylamine)
DBTDL: Dibutyltin dilaurate (manufactured by Tokyo Kasei Kogyo Co., Ltd.)
Isocyanate: Coronate HX (manufactured by Nippon Polyurethane Industry Co., Ltd.), Index = (NCO group mol number/OH groups mol number) × 100

As is evident from Tables 7 and 8, in Examples 54 to 65, by the combination of the metal complex catalyst and the quaternary ammonium salt compound, shortening of the pot life is observed as compared with the respective single systems (Comparative Examples 49 to 59) or DBTDL as a tin catalyst (Comparative Example 60), and they are catalytic systems excellent in curing properties. Further, the hardness of the polyurethane resins molded by the catalyst of the present invention was at a level equal to DBTDL and thus is practically useful.

The entire disclosures of Japanese Patent Application No. 2003-074544 filed on Mar. 18, 2003, Japanese Patent Application No. 2003-128994 filed on May 7, 2003 and Japanese Patent Application No. 2003-136128 filed on May 14, 2003 including specifications, claims and summaries are incorporated herein by reference in their entireties.

What is claimed is:

1. A catalyst composition for production of a polyurethane resin, which comprises a metal complex catalyst represented by the following formula (1):

$$M(acac)_n \quad (1)$$

wherein M represents Mn, Fe, Co, Ni, Cu, Zn, Zr, Ti, Hf, Al or Th, acac represents acetylacetonate, and n is an integer of from 1 to 4, and at least one compound selected from the group consisting of a bicyclic tertiary amine compound represented by the following formula (2):

(2)

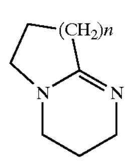

wherein n is an integer of from 1 to 3, a compound having a cumulative double bond, and a quaternary ammonium salt compound.

2. The catalyst composition for production of a polyurethane resin according to claim 1, wherein the metal complex catalyst is at least one metal complex catalyst selected from the group consisting of manganese acetylacetonate, iron acetylacetonate, cobalt acetylacetonate, nickel acetylacetonate, zirconium acetylacetonate and titanium acetylacetonate.

3. The catalyst composition for production of a polyurethane resin according to claim 1, wherein the bicyclic tertiary amine compound is 1,8 -diazabicyclo[5,4,0]undecene-7 or 1,5-diazabicyclo[4,3,0]nonene-5.

4. The catalyst composition for production of a polyurethane resin according to claim 1, wherein the compound having a cumulative double bond is at least one compound selected from the group consisting of an isocyanate, a ketene, an isothiocyanate, a carbodiimide and cumulene.

5. The catalyst composition for production of a polyurethane resin according to claim 4, wherein the isocyanate is at least one compound selected from the group consisting of hexamethylene diioscyanate, hydrogenated dicyclohexylmethane diisocyanate, hydrogenated xylylene diisocyanate, isophorone diisocyanate, norbornane diisocyanate, 1,3-bis (isocyanate methyl)cyclohexane, L-lysine diisocyanate, 1,6, 11-undecane triisocyanate, toluene diisocyanate, diphenylmethane diisocyanate, naphthylene diisocyanate and xylene diisocyanate.

6. The catalyst composition for production of a polyurethane resin according to claim 1, wherein the quaternary ammonium salt compound is a quaternary ammonium salt compound represented by the following formula (3):

(3)

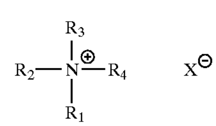

wherein each of $R_1$ to $R_4$ which are independent of one another, is a $C_{1-18}$ alkyl group, a $C_{1-18}$ aryl group, a $C_{1-12}$ hydroxyalkyl group, a $C_{1-12}$ aminoalkyl group, a $C_{1-12}$ monomethylaminoalkyl group, a $C_{1-12}$ dimethylaminoalkyl group, a group represented by the following formula (4):

(4)

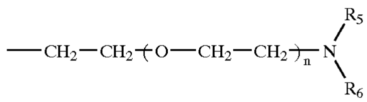

wherein each of $R_5$ and $R_6$ which are independent of each other, is a $C_{1-4}$ alkyl group, and n is an integer of from 0 to 5, or a group represented by the following formula (5):

(5)

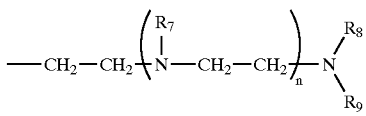

wherein each of $R_7$ to $R_9$ which are independent of one another, is a $C_{1-4}$ alkyl group, and n is an integer of from 0 to 5, any two among $R_1$ to $R_4$ may form a heterocyclic ring via carbon, nitrogen or oxygen atom(s), and X represents an organic acid group or an inorganic acid group.

7. The catalyst composition for production of a polyurethane resin according to claim 6, wherein in the formula (3), the quaternary ammonium is at least one compound selected from the group consisting of tetramethylammonium, methyltriethylammonium, ethyltrimethylammonium, butyltrimethylammonium, hexyltrimethylammonium, octyltrimethylammonium, decyltrimethylammonium, dodecyltrimethylammonium, tetradecyltrimethylammonium, hexadecyltrimethylammonium, octadecyltrimethylammonium, (2-hydroxypropyl)trimethylammonium, hydroxyethyltrimethylammonium, 1-methyl-1-azania-4-azabicyclo[2,2,2]octanium, and 1,1-dimethyl-4-methylpiperidinium.

8. The catalyst composition for production of a polyurethane resin according to claim 6, wherein in the formula (3), X is at least one member selected from the group consisting of a formic group, an acetic group, an octylic group, a methyl carbonic group, a halogen group, a hydroxyl group, a hydrogen carbonic group and a carbonic group.

9. The catalyst composition for production of a polyurethane resin according to claim 1, wherein the blend ratio of the metal complex catalyst (A) represented by the formula (1) to at least one compound (B) selected from the group consisting of the bicyclic tertiary amine compound represented by the formula (2), the compound having a cumulative double bond, and the quaternary ammonium salt compound is (A)/(B)=20 to 0.05 (molar ratio).

10. A method for producing a polyurethane resin, which comprises reacting a polyol with an organic polyisocyanate in the presence of the catalyst composition for production of a polyurethane as defined in claim 1, as a catalyst.

11. A method for producing a polyurethane resin, which comprises reacting a polyol with an organic polyisocyanate in the presence of the catalyst composition for production of a polyurethane as defined in claim 1, as a catalyst, and additives.

12. The method for producing a polyurethane resin according to claim 10, wherein the catalyst is used in an amount of from 0.001 to 20 parts by weight per 100 parts by weight of the polyol.

* * * * *